US012785082B2

(12) United States Patent
Chun et al.

(10) Patent No.: US 12,785,082 B2
(45) Date of Patent: Nov. 3, 2026

(54) POSITIVE ELECTRODE ACTIVE MATERIAL AND LITHIUM SECONDARY BATTERY USING THE SAME

(71) Applicant: ECOPRO BM CO., LTD., Cheongju-si (KR)

(72) Inventors: Yu Gyeong Chun, Cheongju-si (KR); Yong Hwan Gwon, Cheongju-si (KR); Jong Seung Shin, Cheongju-si (KR); Moon Ho Choi, Cheongju-si (KR); Yoon Young Choi, Cheongju-si (KR); Ji Won Kim, Cheongju-si (KR); Sang Hyeok Kim, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 845 days.

(21) Appl. No.: 18/194,307

(22) Filed: Mar. 31, 2023

(65) Prior Publication Data

US 2023/0261181 A1 Aug. 17, 2023

Related U.S. Application Data

(63) Continuation of application No. PCT/KR2022/014911, filed on Oct. 4, 2022.

(30) Foreign Application Priority Data

Oct. 15, 2021 (KR) ........................ 10-2021-0137371
Sep. 2, 2022 (KR) ........................ 10-2022-0111203

(51) Int. Cl.

*H01M 4/36* (2006.01)
*H01M 4/131* (2010.01)
*H01M 4/505* (2010.01)
*H01M 4/525* (2010.01)
*H01M 4/02* (2006.01)

(52) U.S. Cl.

CPC ........... *H01M 4/366* (2013.01); *H01M 4/131* (2013.01); *H01M 4/505* (2013.01); *H01M 4/525* (2013.01); *H01M 2004/021* (2013.01); *H01M 2004/028* (2013.01)

(58) Field of Classification Search

CPC ........ H01M 4/36; H01M 4/366; H01M 4/131; H01M 4/505; H01M 4/525
USPC .............................................. 429/218.1, 220
See application file for complete search history.

(56) References Cited

U.S. PATENT DOCUMENTS

| | | | |
|---|---|---|---|
| 8,354,192 | B2 | 1/2013 | Imanari |
| 2020/0083524 | A1 | 3/2020 | Baek et al. |
| 2021/0005877 | A1 | 1/2021 | Kim et al. |

FOREIGN PATENT DOCUMENTS

| | | | |
|---|---|---|---|
| JP | 2021-070626 | A | 5/2021 |
| KR | 10-2010-0131921 | A | 12/2010 |
| KR | 10-2019-0026571 | A | 3/2019 |
| KR | 10-2021-0015475 | A | 2/2021 |
| KR | 10-2021-0019389 | A | 2/2021 |
| KR | 10-2021-0053862 | A | 5/2021 |
| KR | 10-2021-0065556 | A | 6/2021 |
| WO | 2014/038394 | A1 | 3/2014 |
| WO | 2020/180060 | A1 | 9/2020 |
| WO | 2021/125535 | A1 | 6/2021 |

OTHER PUBLICATIONS

An Office Action mailed by the Japanese Patent Office on Jul. 2, 2024, which corresponds to Japanese Patent Application No. 2023-526487 and is related to U.S. Appl. No. 18/194,307; with English language translation.

*Primary Examiner* — Kevin P Kerns
(74) *Attorney, Agent, or Firm* — Studebaker Brackett PLLC

(57) ABSTRACT

A bimodal-type positive electrode active material includes a first lithium composite oxide as a small particle and a second lithium composite oxide as a large particle, which improves the transport ability of lithium ions by controlling the morphology or crystal structure of the small particle included in the positive electrode active material, and further alleviates or prevents the early deterioration or shortened lifetime of the bimodal-type positive electrode active material, caused by the small particle, by increasing the particle stability of the small particle. A lithium secondary battery using the bimodal-type positive electrode active material is also provided.

19 Claims, No Drawings

POSITIVE ELECTRODE ACTIVE MATERIAL AND LITHIUM SECONDARY BATTERY USING THE SAME

CROSS-REFERENCE TO RELATED APPLICATION

This application is based on the PCT Application No. PCT/KR2022/014911, filed on Oct. 4, 2022, and claims the benefit of priority from the prior Korean Patent Application No. 10-2021-0137371, filed on Oct. 15, 2021, and Korean Patent Application No. 10-2022-0111203, filed on Sep. 2, 2022, the disclosures of which are incorporated herein by reference in its entirety.

TECHNICAL FIELD

The present invention relates to a positive electrode active material and a lithium secondary battery using the same, and more particularly, to a bimodal-type positive electrode active material including a first lithium composite oxide as a small particle and a second lithium composite oxide as a large particle, which can improve a lithium ion transport ability by controlling the morphology or crystal structure of the small particle included in the positive electrode active material, and thus can mitigate or prevent the early deterioration or shortened lifetime of the bimodal-type positive electrode active material due to the small particle by increasing the particle stability of the small particle, and a lithium secondary battery using the same.

BACKGROUND ART

Batteries store electrical power by using materials facilitating an electrochemical reaction at a positive electrode and a negative electrode. As a representative example of such batteries, there is a lithium secondary battery storing electrical energy by means of a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is manufactured by charging a liquid organic electrolyte or a polymer electrolyte between the positive electrode and the negative electrode.

As a positive electrode active material of the lithium secondary battery, a lithium composite oxide may be used, and for example, composite oxides such as $LiCoO_2$, $LiMn_2O_4$, $LiNiO_2$, $LiMnO_2$ are being studied.

Among the positive electrode active materials, $LiCoO_2$ is most widely used due to excellent lifetime characteristics and charge/discharge efficiency, but it is expensive due to cobalt being a limited resource, which is used as a raw material, and thus has a disadvantage of limited price competitiveness.

Lithium manganese oxides such as $LiMnO_2$ and $LiMn_2O_4$ have advantages of excellent thermal safety and low costs, but also have problems of small capacity and poor high-temperature characteristics. In addition, while a $LiNiO_2$-based positive electrode active material exhibits a battery characteristic such as a high discharge capacity, due to cation mixing between Li and a transition metal, it is difficult to synthesize the $LiNiO_2$-based positive electrode active material, thereby causing a big problem in rate characteristics.

Meanwhile, a lithium composite oxide included in a positive electrode active material is accompanied by a volume change according to the intercalation/deintercalation of lithium ions for the lithium composite oxide during charging/discharging. Usually, a lithium composite oxide is in the form of a secondary particle in which a plurality of unit particles (primary particles) are aggregated, and when an abrupt volume change of primary particles during charging/discharging, or stress caused by repeated charging/discharging is accumulated, there is a problem in that cracks occur in the primary particles and/or secondary particles, or the collapse or change (phase transition) of the crystal structures thereof occurs.

Since this problem eventually acts as a cause of degrading the stability and reliability of a positive electrode active material, various studies have been conducted to mitigate the volume change of a lithium composite oxide during charging/discharging, or preventing the damage to particles by minimizing the generation of stress due to the volume change.

In addition, recently, a bimodal-type positive electrode active material in which small particles and large particles, which have different average particle diameters, are mixed is often used to increase the capacity of a lithium secondary battery. When small particles and large particles are mixed, a void between the large particles may be filled with small particles with a relatively smaller average particle diameter, thereby improving the integration density of the lithium composite oxide in a unit volume and thus increasing the energy density per unit volume.

However, such a bimodal-type positive electrode active material includes a small particle and a large particle, which have different average particle diameters and particle size distributions, and when the stability of any one of the small particle and the large particle is degraded, the early deterioration or shortened lifetime of the bimodal-type positive electrode active material may be caused.

DISCLOSURE

Technical Problem

Conventionally, stress caused by the volume change of a primary particle has been dispersed due to a predetermined void between adjacent primary particles to mitigate the volume change of a lithium composite oxide constituting a positive electrode active material during charging/discharging, or to prevent the damage to particles by minimizing the generation of stress due to the volume change. However, such a lithium composite oxide has a limitation that the energy density per unit volume is low.

Meanwhile, for a bimodal-type positive electrode active material, it can be mentioned that the balance of particle stability between small particles and large particles is important because the stress applied to small particles and large particles and the level of volume change of particles thereby are different due to repeated charging/discharging.

In order to increase the particle stability of a small particle in the bimodal-type positive electrode active material, it is possible to consider reducing the number of unit particles constituting a small particle, rather than the number of unit particles constituting a large particle.

The smaller the number of unit particles, the higher the influence by the electrochemical properties or particle stability of each unit particle. Accordingly, when only the number of unit particles constituting a small particle is reduced without considering the electrochemical properties or particle stability of a unit particle constituting a small particle, these small particles simply serve to fill a void between large particles, or rather act as a cause of early deterioration or a shortened lifetime of a bimodal-type positive electrode active material.

Under these circumstances, the inventors confirmed that the lithium intercalation/deintercalation efficiency of a small particle is not only changed greatly, but the extent of a polarization phenomenon during charging/discharging is changed due to the morphology and crystal structure of a small particle in a bimodal-type positive electrode active material.

Accordingly, the present invention is directed to providing a bimodal-type positive electrode active material including a first lithium composite oxide as a small particle and a second lithium composite oxide as a large particle, which can improve lithium ion transport ability by controlling the morphology or crystal structure of the small particle included in the positive electrode active material, and thus the transport and diffusion ability of lithium ions in the small particle, between the small particles, and between the small particle and the large particle increases, thereby mitigating or preventing an unnecessary increase in resistance of the positive electrode active material.

In addition, the present invention is directed to providing a bimodal-type positive electrode active material including a first lithium composite oxide as a small particle and a second lithium composite oxide as a large particle, which can increase the particle stability of the small particle by controlling the morphology or crystal structure of the small particle included in the positive electrode active material and mitigate or prevent the generation of cracks in the small particle, the collapse and/or change (phase transition) of the crystal structure.

In addition, the present invention is directed to providing a positive electrode including the positive electrode active material defined herein.

Moreover, the present invention is directed to providing a lithium secondary battery using the positive electrode defined herein.

The objects of the present invention are not limited to the above-mentioned objects (e.g., for electric vehicles), and other objects and advantages of the present invention which are not mentioned can be understood by the following description and more clearly understood by exemplary embodiments of the present invention. In addition, it will be readily apparent that the objects and advantages of the present invention may be realized by means determined by the claims and a combination thereof.

TECHNICAL SOLUTION

One aspect of the present invention provides a bimodal-type positive electrode active material, which includes a first lithium composite oxide as a small particle and a second lithium composite oxide as a large particle.

Here, each of the first lithium composite oxide and the second lithium composite oxide independently includes at least one unit particle, and as the number of unit particles constituting the first lithium composite oxide is smaller than that of the second lithium composite oxide, it is possible to improve the lithium intercalation/deintercalation efficiency caused by the first lithium composite oxide to a level equal or similar to that of the second lithium composite oxide.

In one embodiment, the first lithium composite oxide may be present as a single unit particle in a non-aggregated form, and the second lithium composite oxide may be present as a secondary particle in which a plurality of unit particles are aggregated.

Here, the lithium ion transport ability of the first lithium composite oxide may be improved by allowing the ratio of the major axis length (r1) and the minor axis length (r2) of the unit particle constituting the first lithium composite oxide to be in the range of 1.3 to 2.1.

In addition, the generation of cracks in the unit particle may be mitigated or prevented by reducing the polarization phenomenon in the unit particle during charging/discharging by allowing the ratio of the major axis length (r1) and the minor axis length (r2) of the unit particle constituting the first lithium composite oxide to be in the range of 1.3 to 2.1.

In one embodiment, in the unit particle constituting the first lithium composite oxide, a lithium ion diffusion path may be formed along the major axis direction of the unit particle.

Here, the major axis length (r1) of the unit particle constituting the first lithium composite oxide may correspond to the major axis length of a first crystal plane corresponding to the (003) plane of the crystal structure of the unit particle, and the minor axis length (r2) of the unit particle constituting the first lithium composite oxide may correspond to a minor axis length perpendicular to the major axis length (r1) of the first crystal plane. Here, in the unit particle constituting the first lithium composite oxide, a lithium ion diffusion path may be formed along the major axis direction of the first crystal plane.

The lithium ion diffusion path formed in the unit particle constituting the first lithium composite oxide may be formed along the major axis direction of the (003) plane instead of being directed to the (003) plane where the discharge of lithium ions is relatively blocked, andthereby the lithium ion diffusion path may be directed to a different plane where the release of lithium ions is relatively easy.

Here, when the major axis length (r1) of the first crystal plane is excessively long, the lithium ion diffusion path in the unit particle is excessively long, so the diffusion ability of lithium ions in the unit particle is degraded and the resistance of the unit particle increases.

The first lithium composite oxide and the second lithium composite oxide may each be independently represented by Formula 1 below.

$$Li_wNi_{1-(x+y+z)}Co_xM1_yM2_zO_2 \quad \text{[Formula 1]}$$

Wherein, M1 is at least one selected from Mn and Al, M2 is at least one selected from P, Sr, Ba, B, Ce, Cr, Mn, Mo, Na, Ca, K, Ti, Zr, Al, Hf, Ta, Mg, V, Zn, Si, Y, Sn, Ge, Nb, W and Cu, M1 and M2 are different elements, $0.5 \le w \le 1.5$, $0 \le x \le 0.20$, $0 \le y \le 0.20$, and $0 \le z \le 0.20$.

In addition, the positive electrode active material may further include a first coating layer that covers at least a part of the surface of the unit particle constituting the first lithium composite oxide, and the first coating layer may include at least one metal oxide represented by Formula 2 below.

$$Li_aA_bO_c \quad \text{[Formula 2]}$$

Wherein, A is at least one selected from Ni, Mn, Co, Fe, Cu, Nb, Mo, Ti, Al, Cr, Zr, Zn, Na, K, Ca, Mg, Pt, Au, B, P, Eu, Sm, W, V, Ba, Ta, Sn, Hf, Ce, Gd and Nd, $0 \le a \le 10$, $0 \le b \le 8$, $2 \le c \le 15$, and a and b are not 0 at the same time.

In addition, the positive electrode active material may further include a second coating layer that covers at least a part of the surface of the unit particle constituting the second lithium composite oxide, and the second coating layer may include at least one metal oxide represented by Formula 2 below.

$$Li_aA_bO_c \quad \text{[Formula 2]}$$

Wherein, A is at least one selected from Ni, Mn, Co, Fe, Cu, Nb, Mo, Ti, Al, Cr, Zr, Zn, Na, K, Ca, Mg, Pt, Au, B, P, Eu, Sm, W, V, Ba, Ta, Sn, Hf, Ce, Gd and Nd, $0 \le a \le 10$, $0 \le b \le 8$, $2 \le c \le 15$, and a and b are not 0 at the same time.

The metal oxides present on the first and second coating layers may be the same or different.

In addition, another aspect of the present invention provides a positive electrode including the positive electrode active material defined herein.

Moreover, still another aspect of the present invention provides a lithium secondary battery using the positive electrode defined herein.

Advantageous Effects

Positive electrode active materials according to various embodiments of the present invention are bimodal-type positive electrode active materials each including a first lithium composite oxide as a small particle and a second lithium composite oxide as a large particle, which have different average particle diameters, and in which a void between large particles can be filled with a small particle with a relatively small average particle diameter, thereby improving the integration density of a lithium composite oxide in a unit volume and increasing the energy density per unit volume.

In addition, according to the present invention, a lithium ion transport ability can be improved by controlling the shape or crystal structure of the small particle included in the bimodal-type positive electrode active material, and thereby the transport and diffusion abilities of lithium ions in the small particles, between the small particles and between the small particle and the large particle can increase. Therefore, an unnecessary increase in resistance of the positive electrode active material can be mitigated or prevented.

In addition, according to the present invention, the generation of cracks, the collapse and/or change (phase transition) of the crystal structure in the small particle can be mitigated or prevented by increasing the particle stability of the small particle by controlling the morphology or crystal structure of the small particle included in the bimodal-type positive electrode active material.

In addition to the above effects, specific effects of the present invention will be described together while explaining specific details for carrying out the present invention.

MODES OF THE INVENTION

In order to better understand the present invention, certain terms are defined herein for convenience. Unless defined otherwise herein, scientific and technical terms used herein will have meanings commonly understood by those of ordinary skill in the art. In addition, unless specifically indicated otherwise, terms in a singular form also include plural forms, and terms in a plural form should be understood to include singular forms as well.

Hereinafter, a positive electrode active material according to the present invention and a lithium secondary battery including the positive electrode active material will be described in further detail.

Positive Electrode Active Material

According to one aspect of the present invention, a bimodal-type positive electrode active material including a first lithium composite oxide as a small particle and a second lithium composite oxide as a large particle is provided.

Here, the first lithium composite oxide and the second lithium composite oxide each independently include at least one unit particle, and by making the number of unit particles constituting the first lithium composite oxide smaller than that of the second lithium composite oxide, it is possible to improve the efficiency of lithium intercalation/deintercalation mediated by the first lithium composite oxide to a level equal or similar to that of the second lithium composite oxide. The term "unit particle" used herein is used in the same sense as a primary particle.

In the present invention, as a small particle, a lithium composite oxide having an average particle diameter (D50) of 8.5 μm or less, preferably, 2.0 to 6.0 μm, and more particularly, 2.5 to 5.0 μm may be used.

In addition, in the present invention, as a large particle, a lithium composite oxide having an average particle diameter (D50) of more than 8.5 μm, preferably 10 to 18 μm, and more particularly, 12 to 16 μm may be used.

In one embodiment, the first lithium composite oxide may be present as a single unit particle in a non-aggregated form, and the second lithium composite oxide may be present as a secondary particle in which a plurality of unit particles are aggregated.

Here, the average particle diameter of the unit particle constituting the second lithium composite oxide is 0.1 to 5.0 μm. Here, the average particle diameter constituting the second lithium composite oxide may be smaller than that of the first lithium composite oxide, which is a unit particle itself.

In the bimodal-type positive electrode active materials according to various embodiments of the present invention, when the weight % of the first lithium composite oxide is w1, and the weight % of the second lithium composite oxide is w2, w2/w1 may be in the range of 1.5 to 9.0.

The first lithium composite oxide may be present in a void in particles of the second lithium composite oxide, attached to the surface of the second lithium composite oxide, or aggregated with each other.

When the ratio of the first lithium composite oxide to the second lithium composite oxide in the positive electrode active material is excessively small, it may be difficult to sufficiently fill the void formed by particles of the second lithium composite oxide with the first lithium composite oxide.

On the other hand, when the ratio of the first lithium composite oxide to the second lithium composite oxide in the positive electrode active material is excessively large, as the rate of the aggregation of particles of the first lithium composite oxide in the positive electrode active material, there may be a concern about a degradation in stability of the positive electrode active material, such as a decrease in press density of the positive electrode active material.

The first lithium composite oxide and the second lithium composite oxide are each independently represented by Formula 1 below.

$$Li_wNi_{1-(x+y+z)}Co_xM1_yM2_zO_2 \quad \text{[Formula 1]}$$

Wherein, M1 is at least one selected from Mn and Al, M2 is at least one selected from P, Sr, Ba, B, Ce, Cr, Mn, Mo, Na, Ca, K, Ti, Zr, Al, Hf, Ta, Mg, V, Zn, Si, Y, Sn, Ge, Nb, W and Cu, M1 and M2 are different elements, $0.5 \le w \le 1.5$, $0 \le x \le 0.20$, $0 \le y \le 0.20$, and $0 \le z \le 0.20$.

For the first lithium composite oxide and the second lithium composite oxide, the molar ratio of nickel calculated by Equation 1 below may be 0.6 or more, and preferably, 0.8 or more.

$$\text{Ni(molar ratio)}=\text{Ni(mol \%)}/(\text{Ni(mol \%)}+\text{Co(mol \%)}+\text{M1(mol \%)}+\text{M2 (mol \%)}) \quad \text{[Equation 1]}$$

In addition, for the first lithium composite oxide and the second lithium composite oxide, the molar ratio of cobalt calculated in Equation 2 below may be 0.2 or less, and preferably, 0.15 or less.

$$\text{Co(molar ratio)}=\text{Co(mol \%)}/(\text{Ni(mol \%)}+\text{Co(mol \%)}+\text{M1(mol \%)}+\text{M2 (mol \%)}) \quad \text{[Equation 2]}$$

Generally, in a lithium composite oxide including at least nickel and cobalt, as the Ni content increases, it is known that the structural instability of the lithium composite oxide may be caused by Li/Ni cation mixing. In addition, in the lithium composite oxide including at least Ni and Co, as the Co content decreases, it is reported that the initial overvoltage (resistance) increases, and therefore the decrease in rate characteristic is inevitable.

However, the first lithium composite oxide and second lithium composite oxide included in positive electrode active materials according to various embodiments of the present invention may have a coating layer formed on at least a part of their surfaces or have a concentration gradient formed by reducing the concentration of a metal element from the surface to the center, thereby improving the structural stability and rate characteristic of a high-Ni or high-Ni/low-Co lithium composite oxide.

In one embodiment, as the ratio of the major axis length (r1) and the minor axis length (r2) of the unit particle constituting the first lithium composite oxide is allowed to be in the range of 1.3 to 2.1, and preferably, 1.5 to 2.0, the lithium ion transport ability of the first lithium composite oxide may be improved.

In addition, as the ratio of the major axis length (r1) and the minor axis length (r2) of the unit particle constituting the first lithium composite oxide is allowed to be in the range of 1.3 to 2.1, the generation of cracks in the unit particle may be mitigated or prevented by reducing a polarization phenomenon in the unit particle during charging/discharging.

A lithium ion diffusion path for transporting/diffusing lithium ions may be formed in the unit particle constituting the first lithium composite oxide along the major axis direction of the unit particle. The lithium ion diffusion path refers to a one-dimensional and/or two-dimensional main path for transporting/diffusing lithium in the primary particle according to a vacancy hopping mechanism.

Here, the major axis length (r1) of the unit particle constituting the first lithium composite oxide corresponds to the major axis length of a first crystal plane corresponding to the (003) plane in the crystal structure of the unit particle, and the minor axis length (r2) of the unit particle constituting the first lithium composite oxide corresponds to the minor axis length perpendicular to the major axis length (r1) of the first crystal plane.

The crystal structure of the unit particle and the type of crystal plane included in the crystal structure may be identified through X-ray diffraction analysis using Cu-Kα rays for the unit particle.

That is, the lithium ion diffusion path may be formed in the unit particle constituting the first lithium composite oxide along the major axis direction of the first crystal plane. Accordingly, the lithium ion diffusion path formed in the unit particle constituting the first lithium composite oxide may be formed along the major axis direction of the (003) plane instead of being directed to the (003) plane in which the release of lithium ions is relatively blocked, and thus may be directed to a different crystal plane where the release of lithium ions is relatively easy.

At least one second crystal plane different from the (003) plane may be present in the unit particle constituting the first lithium composite oxide. Here, the lithium ion diffusion path may be formed to be directed to the second crystal plane. The second crystal plane to which the lithium ion diffusion path is directed may be the (012) plane and/or (104) plane, and may be a different crystal plane which is not defined herein. However, in this case, the second crystal plane is preferably a crystal plane where the release of lithium ions is relatively less blocked, compared to the (003) plane.

The ratio of the major axis length (r1) and the minor axis length (r2) of the unit particle constituting the first lithium composite oxide being higher than 2.1 means that the major axis length (r1) of the first crystal plane is excessively long, or the minor axis length (r2) of the first crystal plane is excessively short.

When the major axis length of the first crystal plane in the unit particle is excessively long, the diffusion efficiency of lithium ions in the unit particle is lowered, and the resistance of the unit particle further increases. In addition, there is the increasing possibility of the polarization phenomenon occurring in the unit particle. The polarization phenomenon in the unit particle may be intensified such that the possibility of cracks in the unit particle is increased.

When the minor axis length of the first crystal plane in the unit particle is excessively short, due to the insufficient number of lithium ion diffusion paths formed in the unit particle, the amount of transported and diffused lithium ions per unit length may be not only reduced, but the amount of lithium ions released to the outside of the unit particle may also be reduced.

On the other hand, the ratio of the major axis length (r1) and the minor axis length (r2) of the unit particle constituting the first lithium composite oxide being smaller than 1.3 means that the major axis length (r1) of the first crystal plane is excessively short, or the minor axis length (r2) of the first crystal plane is excessively long.

When the major axis length of the first crystal plane in the unit particle is excessively short, or the minor axis length of the first crystal plane in the unit particle is excessively long, as the length of a lithium ion diffusion path in the unit particle is not sufficiently formed, the diffusion efficiency of lithium ions in the unit particle may decrease, or it may be difficult to realize a sufficient press density of a bimodal-type positive electrode active material using the small particle.

To predict the morphology or crystal structure of the unit particle constituting the first lithium composite oxide, a peak intensity of an arbitrary crystal plane obtained through X ray diffraction analysis using Cu-Kα rays for the unit particle may be used. For example, as an arbitrary crystal plane in the crystal structure of the unit particle is developed, the intensity of the diffraction peak attributed to the corresponding crystal plane may be stronger.

Accordingly, from the ratios of peak intensities between the (003) plane where the release of lithium ions is relatively blocked and the (012) plane and the (104) plane where the release of lithium ions is relatively easy in the crystal structure of the unit particle, the morphology or crystal structure of the unit particle may be predicted.

The ratio of peak intensities attributed to the (003) and (012) planes obtained through X ray diffraction analysis using Cu-Kα rays for the unit particle constituting the first lithium composite oxide defined herein may satisfy Relationship 1 below.

$$0.090 \le I(012)/I(003) \le 0.120 \quad \text{[Relationship 1]}$$

In addition, preferably, I(012)/I(003) calculated by Relationship 1 is 0.095 or more and 0.118 or less.

The ratio of peak intensities attributed to the (003) and (014) planes obtained through X ray diffraction analysis using Cu-Kα rays for the unit particle constituting the first lithium composite oxide defined herein may satisfy Relationship 2 below.

$$0.420 \le I(104)/I(003) \le 0.540 \quad \text{[Relationship 2]}$$

In addition, preferably, I(014)/I(003) calculated by Relationship 2 is 0.450 or more and 0.535 or less.

As the degree of development of the (003) plane increases compared with the (012) plane or (104) plane in the crystal structure of the unit particle, I(012)/I(003) calculated by Relationship 1 or I(104)/I(003) calculated by Relationship 2 may be smaller. On the other hand, as the degree of development of the (012) plane or (104) plane increases compared with the (003) plane of the crystal structure of the unit particle, I(012)/I(003) calculated by Relationship 1 or I(104)/I(003) calculated by Relationship 2 may increase.

When the (003) plane is excessively developed compared with the (012) plane or (104) plane in the crystal structure of the unit particle, the diffusion efficiency of lithium ions in the unit particle is lowered, and the resistance of the unit particle is further increased. In addition, the possibility of the occurrence of a polarization phenomenon in the unit particle is increased.

On the other hand, when the (012) plane or (104) plane is developed more than necessary compared with the (003) plane in the crystal structure of the unit particle, as the length of a lithium ion diffusion path in the unit particle is not sufficiently formed, the diffusion efficiency of lithium ions in the unit particle may decrease, or it may be difficult to realize a sufficient press density of a bimodal-type positive electrode active material using the small particles.

In addition, the positive electrode active material may further include a first coating layer that covers at least a part of the surface of the unit particle constituting the first lithium composite oxide, and the first coating layer may include at least one metal oxide represented by Formula 2 below.

$$Li_aA_bO_c \quad \text{[Formula 2]}$$

Wherein, A is at least one selected from Ni, Mn, Co, Fe, Cu, Nb, Mo, Ti, Al, Cr, Zr, Zn, Na, K, Ca, Mg, Pt, Au, B, P, Eu, Sm, W, V, Ba, Ta, Sn, Hf, Ce, Gd and Nd, $0 \le a \le 10$, $0 \le b \le 8$, $2 \le c \le 15$, and a and b are not 0 at the same time.

Here, a concentration gradient in which the concentration of element A of Formula 2 decreases from the surface to center of the first lithium composite oxide (unit particle) present as a single unit particle in a non-aggregated form may be present. The concentration gradient of element A present in the unit particle may appear by the doping and diffusion of the element A constituting the metal oxide represented by Formula 2 into the unit particle.

In addition, the positive electrode active material may further include a second coating layer that covers at least a part of the surface of the unit particle constituting the second lithium composite oxide, and the second coating layer may include at least one metal oxide represented by Formula 2 below.

$$Li_aA_bO_c \quad \text{[Formula 2]}$$

Wherein, A is at least one selected from Ni, Mn, Co, Fe, Cu, Nb, Mo, Ti, Al, Cr, Zr, Zn, Na, K, Ca, Mg, Pt, Au, B, P, Eu, Sm, W, V, Ba, Ta, Sn, Hf, Ce, Gd and Nd, $0 \le a \le 10$, $0 \le b \le 8$, $2 \le c \le 15$, and a and b are not 0 at the same time.

Here, in at least part of the unit particles constituting the second lithium composite oxide, there may be a concentration gradient in which the concentration of the element A of Formula 2 decreases from the surface to center of the unit particle. The concentration gradient of the element A present in the unit particle may appear by the doping and diffusion of the element A constituting the metal oxide represented by Formula 2 into the unit particle.

In addition, the metal oxide may be diffused along the grain boundary defined between adjacent unit particles from the surface to center of the second lithium composite oxide present as a secondary particle in which a plurality of unit particles are aggregated.

The concentration of the metal oxide may have a concentration gradient that decreases from the surface to center of the secondary particle.

As described above, as the first lithium composite oxide and the second lithium composite oxide included in the bimodal-type positive electrode active material defined herein may have a coating layer formed at least a part of each, or have a concentration gradient in which the concentration of a metal element decreases from the surface to the center, the structural stability and rate characteristic of a high-Ni or high-Ni/low-Co lithium composite oxide may be improved.

The concentration of any element in the first lithium composite oxide and the second lithium composite oxide may be measured by various known methods. For example, after cross-sectional processing of each of the first lithium composite oxide and the second lithium composite oxide, the concentration of the target element may be analyzed by a line scanning method through EDS mapping. In this case, it is possible to confirm a change in concentration of the target element in a direction from the surface to center of each of the first lithium composite oxide and the second lithium composite oxide.

In addition, there is Energy Profiling-Energy Dispersive X-ray Spectroscopy (EP-EDS) for measuring the concentration of a target element accumulated from the surface of the lithium composite oxide to a specific depth to which the electron beam penetrates by an acceleration voltage while changing the acceleration voltage (Vacs) of the electron beam applied to the surfaces of the first lithium composite oxide and the second lithium composite oxide.

For example, after selecting each of a first lithium composite oxide (small particle) and a second lithium composite oxide (large particle) included in the positive electrode active material according to the present invention, it is possible to analyze the cumulative concentration (at %) of the transition metal from the surface of each of the first lithium composite oxide (small particle) and the second lithium composite oxide (large particle) to a specific depth penetrated by the electron beam for each acceleration voltage while changing the acceleration voltage of the electron beam applied to the surface of each of the selected first lithium composite oxide (small particle) and second lithium composite oxide (large particle) from 1 kV to 30 kV (1 kV, 3 kV, 5 kV, 7.5 kV, 10 kV, 12.5 kV, 15 kV, 20 kV, 30 kV).

For example, when it is possible for an electron beam from the surface of each of the first lithium composite oxide and the second lithium composite oxide to penetrate to a depth of approximately 300 nm by applying an electron beam with an acceleration voltage of 10 kV to the surfaces of the first lithium composite oxide and the second lithium composite oxide, the EP-EDS analysis was performed to measure the concentration of a target element present in the region from the surface of each of the first lithium composite oxide and the second lithium composite oxide to a depth of 300 nm. In addition, when it is possible for an electron beam from the surface of each of the first lithium composite oxide and the second lithium composite oxide to penetrate to a depth of approximately 800 nm by applying an electron beam with an acceleration voltage of 20 kV to the surfaces of the first lithium composite oxide and the second lithium composite oxide, the EP-EDS analysis may be performed to measure the concentration of a target element in the region from the surface of each of the first lithium composite oxide and the second lithium composite oxide to a depth of 800 nm.

That is, when the measured cumulative concentration of a target element decreases as the acceleration voltage applied to the surface of each of the first lithium composite oxide and the second lithium composite oxide increases, it can be interpreted as having a gradient in which the concentration of the target element decreases from the surface to center of the first lithium composite oxide or the second lithium composite oxide.

Lithium Secondary Battery

According to another embodiment of the present invention, a positive electrode including a positive electrode current collector and a positive electrode active material layer formed on the positive electrode current collector may be provided. Here, the positive electrode active material layer may include the above-described positive electrode active material prepared by a preparation method according to various embodiments of the present invention as a positive electrode active material. Accordingly, since the positive electrode active material has been described above, a detailed description thereof will be omitted, and only the remaining components not described above will be described below.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 μm, and fine irregularities may be formed on the surface of the current collector, thereby increasing the adhesive strength of a positive electrode active material. For example, the positive electrode current collector may be used in various forms such as a film, a sheet, a foil, a net, a porous body, foam, a non-woven fabric, etc.

The positive electrode active material layer may be prepared by coating the positive electrode current collector with a positive electrode slurry composition including the positive electrode active material, a conductive material, and a binder included optionally as needed.

Here, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black™ (conductive carbon black), channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by coating the positive electrode current collector with a positive electrode slurry composition prepared by dissolving or dispersing the positive electrode active material, and optionally, a binder and a conductive material in a solvent, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied to prepare a positive electrode.

In addition, in another exemplary embodiment, the positive electrode may be prepared by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator film and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator film, and optionally, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 μm, and like the positive electrode current collector, fine irregularities may be formed on the current collector surface, thereby enhancing the binding strength of the negative electrode active material. For example, the negative electrode current collector may be used in various forms such as a film, a sheet, a foil, a net, a porous body, foam, a non-woven fabric, etc.

The negative electrode active material layer may be formed by coating the negative electrode current collector with a negative electrode slurry composition including the negative electrode active material, a conductive material, and a binder optionally included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0\leq\beta\leq2$), $SnO_2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black™ (conductive carbon black), channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an exemplary embodiment, the negative electrode active material layer may be prepared by coating the negative electrode current collector with a negative electrode slurry composition prepared by dissolving or dispersing a negative electrode active material, and optionally, a binder and a conductive material in a solvent, and drying the coated composition, or may be prepared by casting the negative electrode slurry composition on a separate support and then laminating a film delaminated from the support on the negative electrode current collector.

Meanwhile, in the lithium secondary battery, a separator film is not particularly limited as long as it is generally used in a lithium secondary battery to separate a negative electrode from a positive electrode and provide a diffusion path for lithium ions, and particularly, the separator film has a low resistance to ion mobility of an electrolyte and an excellent electrolyte solution impregnation ability. Specifically, a porous polymer film, for example, a porous polymer film prepared of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator film including a ceramic component or a polymer material may be used to ensure thermal resistance or mechanical strength, and may be optionally used in a single- or multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which is able to be used in the production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R-CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of approximately 1:1 to 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance. Therefore, lithium ions can effectively migrate.

To enhance lifetime characteristics of the battery, inhibit a decrease in battery capacity, and enhance discharge capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. Here, the additive(s) may be included at 0.1 to 5 wt % with respect to the total weight of the electrolyte.

Since the lithium secondary battery including the positive electrode active material according to the present invention stably exhibits excellent discharge capacity, excellent output characteristics and excellent lifespan characteristics, it is useful in portable devices such as a mobile phone, a notebook computer and a digital camera and an electric vehicle field such as a hybrid electric vehicle (HEV).

The outer shape of the lithium secondary battery according to the present invention is not particularly limited, but may be a cylindrical, prismatic, pouch or coin type using a can. In addition, the lithium secondary battery may be used in a battery cell that is not only used as a power source of a small device, but also preferably used as a unit battery for a medium-to-large battery module including a plurality of battery cells.

According to still another exemplary embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in further detail with reference to examples. However, these examples are merely provided to exemplify the present invention, and thus the scope of the present invention will not be construed not to be limited by these examples.

Preparation Example 1. Preparation of Bimodal-Type Positive Electrode Active Material

Example 1

(a) $NiCoAl(OH)_2$ hydroxide precursors of a first lithium composite oxide as a small particle and a second lithium composite oxide as a large particle, designed at an atomic ratio of Ni:Co:Al=95:4:1 (at %) through a known co-precipitation method using nickel sulfate, cobalt sulfate and aluminum sulfate, were synthesized, respectively.

Each synthesized $NiCoAl(OH)_2$ hydroxide precursor was heated at a rate of 2° C. per minute until 400° C. and sintered at 400° C. for 6 hours to be converted into an oxide precursor.

The average particle diameter (D50) of the oxide precursor (first oxide precursor) of the first lithium composite oxide was 3.0 μm, and the average particle diameter (D50) of the oxide precursor (second oxide precursor) of the second lithium composite oxide was 15.0 μm.

(b) After weighing the first oxide precursor and the second oxide precursor prepared in (a) to have a weight ratio of 30:70, LiOH (Li/(Ni+Co+Al) mol ratio=1.05) and NaOH (Na/(Ni+Co+Al) mol ratio=0.005) were added and then mixed therewith, and the resulting mixtures were thermally treated for 12 hours by raising the temperature of a sintering furnace to 850° C. at a rate of 2° C. per minute while maintaining an $O_2$ atmosphere, thereby obtaining intermediate products.

(c) By inputting distilled water to each intermediate product and stirring the resulting solution at 300 rpm for 1 hour while adding 7.0 wt % of a cobalt sulfate aqueous solution so as to contain cobalt derived from the cobalt sulfate aqueous solution at 3.0 mol % relative to metal elements (Ni+Co+Al) excluding lithium in the intermediate product, each surface of the first oxide precursor and the second oxide precursor of the intermediate products was coated with cobalt. After the completion of the reaction, the resultant was dried at 120° C. for 12 hours.

(d) By increasing the temperature of a sintering furnace to 700° C. at a rate of 2° C. per minute while maintaining an $O_2$ atmosphere and thermally treating the intermediate product at 700° C. for 12 hours, a bimodal-type positive electrode active material in which a first lithium composite oxide as a small particle and a second lithium composite oxide as a large particle are mixed in a predetermined ratio was obtained.

It was confirmed that, in the positive electrode active material obtained in (d), the first lithium composite oxide presents as a single unit particle in a non-aggregated form, and the second lithium composite oxide presents as a secondary particle in which a plurality of unit particles are aggregated.

Example 2

A positive electrode active material was obtained in the same manner as in Example 1, except that KOH (K/(Ni+Co+Al) mol ratio=0.005), instead of NaOH, was used in (b).

It was confirmed that the positive electrode active material obtained in Example 2 is a bimodal type in which a small particle is present as a single unit particle in a non-aggregated form and a large particle is present as a secondary particle in which a plurality of unit particles are aggregated are mixed as in Example 1.

Example 3

A positive electrode active material was obtained in the same manner as in Example 1, except that $Ca(OH)_2$ (Ca/(Ni+Co+Al) mol ratio=0.005), instead of NaOH, was used in (b).

It was confirmed that the positive electrode active material obtained in Example 3 is a bimodal type in which a small particle is present as a single unit particle in a non-aggregated form and a large particle is present as a secondary particle in which a plurality of unit particles are aggregated are mixed as in Example 1.

Example 4

A positive electrode active material was obtained in the same manner as in Example 1, except that NaOH (Na/(Ni+Co+Al) mol ratio=0.003) and $Zr(OH)_4$ (Zr/(Ni+Co+Al) mol ratio=0.002) were mixed in (b).

It was confirmed that the positive electrode active material obtained in Example 4 is a bimodal type in which a small particle is present as a single unit particle in a non-aggregated form and a large particle is present as a secondary particle in which a plurality of unit particles are aggregated are mixed as in Example 1.

Example 5

A positive electrode active material was obtained in the same manner as in Example 1, except that a mixture of KOH (K/(Ni+Co+Al) mol ratio=0.003) and $Zr(OH)_4$ (Zr/(Ni+Co+Al) mol ratio=0.002), instead of NaOH, was used in (b).

It was confirmed that the positive electrode active material obtained in Example 5 is a bimodal type in which a small particle is present as a single unit particle in a non-aggregated form and a large particle is present as a secondary particle in which a plurality of unit particles are aggregated are mixed as in Example 1.

Example 6

A positive electrode active material was obtained in the same manner as in Example 1, except that a mixture of $Ca(OH)_2$ (Ca/(Ni+Co+Al) mol ratio=0.003) and $Zr(OH)_4$ (Zr/(Ni+Co+Al) mol ratio=0.002), instead of NaOH, was used.

It was confirmed that the positive electrode active material obtained in Example 6 is a bimodal type in which a small particle is present as a single unit particle in a non-aggregated form and a large particle is present as a secondary particle in which a plurality of unit particles are aggregated are mixed as in Example 1.

Comparative Example 1

A positive electrode active material was obtained in the same manner as in Example 1, except that $Zr(OH)_4$ (Zr/(Ni+Co+Al) mol ratio=0.005), instead of NaOH, was used in (b).

It was confirmed that the positive electrode active material obtained in Comparative Example 1 is a bimodal type in which a small particle is present as a single unit particle in a non-aggregated form and a large particle is present as a secondary particle in which a plurality of unit particles are aggregated are mixed as in Example 1.

Comparative Example 2

A positive electrode active material was obtained in the same manner as in Example 1, except that NaOH was not used in (b).

It was confirmed that both the small particle and large particle included in the positive electrode active material obtained in Comparative Example 2 are present as secondary particles in which a plurality of unit particles are aggregated.

Comparative Example 3

A positive electrode active material was obtained in the same manner as in Example 1, except that the content of NaOH used in (b) was 0.003 mol % (Na/(Ni+Co+Al) mol ratio=0.003).

It was confirmed that the positive electrode active material obtained in Comparative Example 3 is a bimodal type in which a small particle is present as a single unit particle in a non-aggregated form and a large particle is present as a secondary particle in which a plurality of unit particles are aggregated are mixed as in Example 1.

Comparative Example 4

A positive electrode active material was obtained in the same manner as in Example 1, except that the content of NaOH used in (b) was 0.003 mol % (Na/(Ni+Co+Al) mol ratio=0.003), and the intermediate product and NaOH (Na/(Ni+Co+Al) mol ratio=0.002) were mixed and then thermally treated in (d).

It was confirmed that the positive electrode active material obtained in Comparative Example 4 is a bimodal type in which a small particle is present as a single unit particle in a non-aggregated form and a large particle is present as a secondary particle in which a plurality of unit particles are aggregated are mixed as in Example 1.

Preparation Example 2. Manufacture of Lithium Secondary Battery

A positive electrode slurry was prepared by dispersing 92 wt % of the positive electrode active material prepared according to Preparation Example 1, 4 wt % of artificial graphite, and 4 wt % of a PVDF binder in 30 g of N-methyl-2 pyrrolidone (NMP). The positive slurry was uniformly applied to an aluminum thin film with a thickness of 15 μm and dried in vacuo at 135° C., thereby manufacturing a positive electrode for a lithium secondary battery.

The positive electrode, lithium foil as a counter electrode, and a porous polyethylene film (Celgard 2300, thickness: 25 μm) as a separator, and an electrolyte prepared by adding $LiPF_6$ at 1.15M in a solvent in which ethylene carbonate and ethyl methyl carbonate were mixed in a volume ratio of 3:7 were used to manufacture a coin cell.

Experimental Example 1. EP-EDS Analysis of Small Particles/Large Particles

In Preparation Example 1, a process of forming a metal oxide including cobalt on at least a part of the surfaces of unit particles constituting the first lithium composite oxide (small particle) and the second lithium composite oxide (large particle) was performed.

Accordingly, to measure the content of cobalt in the first lithium composite oxide (small particle) and the second lithium composite oxide (large particle) included in the positive electrode active material prepared according to Preparation Example 1, EP-EDS analysis was performed.

For EP-EDS analysis, a first lithium composite oxide (small particle) and a second lithium composite oxide (large particle) included in each of the positive electrode active materials of Examples 1, 3 and 5 were selected, and then the cumulative concentration (at %) of cobalt to a specific depth that an electron beam penetrates for each acceleration voltage while changing the acceleration voltage of an electron beam applied to the surface of each of the selected first lithium composite oxide (small particle) and second lithium composite oxide (large particle) from 1 kV to kV (1 kV, 3 kV, 5 kV, 7.5 kV, 10 kV, 12.5 kV, 15 kV, 20 kV, 30 kV) was analyzed.

The absolute value of the slope of the cobalt concentration gradient measured in the region in which the acceleration voltage of an electron beam applied to the surface of the first lithium composite oxide (small particle) ranges from 1 kV to 30 kV was set to be s1, and the absolute value of the slope of the cobalt concentration gradient measured in the region in which the acceleration voltage of an electron beam applied to the surface of the second lithium composite oxide (large particle) ranges from 1 kV to 30 kV was set to be s2.

The s1 and s2 representing the slope of the cobalt concentration gradient were calculated by the setting the y axis as the change in cobalt concentration (Δ at %) and setting the x axis as the change in EDS acceleration voltage (Δ kV %), and these changes were calculated as the average values obtained by adding the slopes of respective measurement areas. The EP-EDS analysis results are shown in Table 1 below.

TABLE 1

| Classification | | Cumulative concentration of cobalt per acceleration voltage (at %) | | | | | | | | |
|---|---|---|---|---|---|---|---|---|---|---|
| | | 1 kV | 3 kV | 5 kV | 7.5 kV | 10 kV | 12.5 kV | 15 kV | 20 kV | 30 kV |
| Example 1 | Large particle | 39.00 | 28.51 | 21.94 | 17.09 | 14.55 | 13.00 | 11.15 | 10.71 | 9.37 |
| | Small particle | 23.55 | 21.22 | 17.21 | 15.77 | 13.65 | 12.52 | 10.61 | 9.67 | 8.27 |
| Example 3 | Large particle | 39.16 | 28.27 | 21.26 | 16.71 | 14.09 | 12.43 | 10.62 | 10.17 | 9.43 |
| | Small particle | 22.94 | 21.05 | 17.04 | 14.88 | 12.99 | 12.01 | 10.20 | 9.44 | 8.25 |
| Example 5 | Large particle | 39.49 | 29.35 | 22.42 | 17.31 | 14.51 | 12.48 | 11.00 | 10.49 | 9.40 |
| | Small particle | 22.44 | 20.91 | 16.98 | 14.62 | 12.90 | 11.99 | 10.01 | 9.16 | 8.02 |

Referring to the results in Table 1, it can be confirmed that there is a concentration gradient in which the concentration of cobalt decreases from the surface to center of the first lithium composite oxide (small particle) present as a single unit particle in a non-aggregated form. The results are obtained by the doping and diffusion of cobalt coated on the surface of the first oxide precursor of the first lithium composite oxide (small particle) into the unit particles in (c) of Preparation Example 1.

In addition, referring to the results in Table 1, it can be confirmed that there is a concentration gradient in which a cobalt concentration decreases from the surface to center of the second lithium composite oxide (large particle) present as a secondary particle in which a plurality of unit particles are aggregated. The above results are obtained due to the cobalt coated on the surface of the second oxide precursor of the second lithium composite oxide (large particle) in (c) of Preparation Example 1 exists as the cobalt-containing metal oxide diffused along the grain boundary defined between adjacent unit particles from the surface to center of the secondary particle.

Experimental Example 2. SEM Analysis of First Lithium Composite Oxide (Small Particle)

After selecting each of a first lithium composite oxide (small particle) and a second lithium composite oxide (large particle) included in each positive electrode active material prepared in Preparation Example 1, a photograph of each of the selected first lithium composite oxide (small particle) and second lithium composite oxide (large particle) was taken using FE-SEM (Bruker) to obtain a cross-sectional SEM image, and the average particle diameters of the first lithium composite oxide (small particle) and the second lithium composite oxide (large particle) were then measured.

TABLE 2

| Classification | Average particle diameter (μm) | |
|---|---|---|
| | First lithium composite oxide (small particle) | Second lithium composite oxide (large particle) |
| Example 1 | 2.9 | 14.5 |
| Example 2 | 3.0 | 14.3 |
| Example 3 | 3.0 | 14.4 |
| Example 4 | 2.9 | 14.4 |
| Example 5 | 3.1 | 14.5 |
| Example 6 | 3.1 | 14.3 |
| Comparative Example 1 | 2.9 | 14.3 |

TABLE 2-continued

| | Average particle diameter (μm) | |
|---|---|---|
| Classification | First lithium composite oxide (small particle) | Second lithium composite oxide (large particle) |
| Comparative Example 2 | 3.0 | 14.3 |
| Comparative Example 3 | 3.0 | 14.5 |
| Comparative Example 4 | 3.1 | 14.5 |

Referring to the result of Comparative Example 2 shown in Table 1, even when a small particle is present as a secondary particle in which a plurality of unit particles are aggregated, it can be confirmed that its average particle diameter is almost similar to those of the other Examples and Comparative Examples.

Subsequently, from the cross-sectional SEM image, a ratio of the major axis length (r1) and the minor axis length (r2) of the first lithium composite oxide (unit particle) present as a single unit particle in a non-aggregated form was calculated. Table 3 below shows the average value of r1/r2 calculated from 100 small particles selected from each positive electrode active material.

TABLE 3

| Classification | r1/r2 |
|---|---|
| Example 1 | 1.6 |
| Example 2 | 1.8 |
| Example 3 | 1.5 |
| Example 4 | 1.8 |
| Example 5 | 2.0 |
| Example 6 | 1.6 |
| Comparative Example 1 | 2.3 |
| Comparative Example 2 | 2.7 |
| Comparative Example 3 | 2.5 |
| Comparative Example 4 | 1.1 |

Experimental Example 3. XRD Analysis of First Lithium Composite Oxide (Small Particle)

A first lithium composite oxide (small particle) included in each positive electrode active material prepared according to Preparation Example 1 was selected, and subjected to X ray diffraction (XRD) analysis, followed by detecting a peak attributed to the crystal plane included in the crystal structure of the first lithium composite oxide.

The XRD analysis was performed using a Bruker D8 ENDEAVOR diffractometer with Cu-Kα radiation (1.540598 Å), and the intensity ratio between peaks attributed to a specific crystal plane is shown in Table 4 below.

TABLE 4

| | Peak intensity rate | |
|---|---|---|
| Classification | I(104)/I(003) | I(012)/I(003) |
| Example 1 | 0.460 | 0.114 |
| Example 2 | 0.534 | 0.099 |
| Example 3 | 0.535 | 0.118 |
| Example 4 | 0.458 | 0.098 |
| Example 5 | 0.451 | 0.095 |
| Example 6 | 0.534 | 0.116 |
| Comparative Example 1 | 0.409 | 0.080 |
| Comparative Example 2 | 0.386 | 0.072 |

TABLE 4-continued

| | Peak intensity rate | |
|---|---|---|
| Classification | I(104)/I(003) | I(012)/I(003) |
| Comparative Example 3 | 0.399 | 0.075 |
| Comparative Example 4 | 0.554 | 0.123 |

The change in ratio between peaks attributed to each crystal plane may be used as an indicator that confirms the growth of an arbitrary crystal plane. For example, the ratio of (104)/(003) peak intensities may be used as an indicator that predicts the degree of the (104) plane growth relative to the (003) plane or the degree of the (003) plane growth relative to the (104) plane.

Referring to the results in Table 4, it can be confirmed that the ratio of (104)/(003) peak intensities and the ratio of (012)/(003) peak intensities, measured from the first lithium composite oxide (small particle) included in each of the positive electrode active materials according to Comparative Examples 1 to 3, are smaller than those measured from the first lithium composite oxide (small particle) included in each of the positive electrode active materials according to Examples 1 to 6. The result shows that the growth of the (104) plane and (012) plane relative to the (003) plane of the small particle included in each of the positive electrode active materials according to Examples 1 to 6 is induced, compared to that of the small particles included in the positive electrode active materials according to Comparative Examples 1 to 3.

Considering the ratios between the major axis length (r1) and the minor axis length (r2), shown in Table 3, it can be confirmed that the degree of the (003) plane growth and r1/r2 are in a proportional relationship. In this case, when the growth of the (104) plane and the (012) plane relative to the (003) plane is induced, r1/r2 has a relatively small value.

Accordingly, referring to the results in Tables 3 and 4, it can be expected that the major axis direction of a small particle included in each of the positive electrode active materials according to Examples 1 to 6 corresponds to the major axis direction of the (003) plane. Since a lithium ion diffusion path in small particles is formed along the major axis direction of the (003) plane (that is, formed along the direction parallel to the major axis direction of the (003) plane), the lithium ion diffusion path in small particles may be formed to be directed to the (104) plane and/or (012) plane where lithium ions are relatively easily released.

Experimental Example 4. Evaluation of Physical Properties of Positive Electrode Active Material (1) After weighing 3 g of each positive electrode active material prepared according to Preparation Example 1, the resulting sample was pressurized under 4.5 tons for 5 seconds using a pelletizer to measure a press density.

(2) After 50 cycles of charging/discharging of each lithium secondary battery (coin cell) prepared in Preparation Example 2 at 25° C. and an operating voltage range of 3.0V to 4.25V under a condition of 1C/1C, a positive electrode was separated, and a positive electrode active material was retrieved from the separated positive electrode, followed by photographing a cross-sectional SEM image. To quantify the crack area in the cross-sectional SEM image, the outer region of a plurality of particles confirmed from the (binarized) cross-sectional SEM image was set, a dark region in the outer region was regarded as a crack, and a ratio of the area of the dark region to the total area in the outer region was defined as a crack generation rate (%).

The measurement result is shown in Table 5 below.

TABLE 5

| Classification | Press density (g/cc) | Crack generation rate (%) |
|---|---|---|
| Example 1 | 3.55 | 5.4 |
| Example 2 | 5.51 | 5.6 |
| Example 3 | 3.54 | 3.3 |
| Example 4 | 3.53 | 3.7 |
| Example 5 | 3.55 | 3.9 |
| Example 6 | 3.55 | 3.4 |
| Comparative Example 1 | 3.57 | 8.1 |
| Comparative Example 2 | 3.55 | 10.9 |
| Comparative Example 3 | 3.57 | 9.3 |
| Comparative Example 4 | 3.48 | 6.4 |

Referring to the results of Table 5, although the press densities of the positive electrode active materials according to Examples 1 to 6 and the positive electrode active materials according to Comparative Examples 1 to 4 are almost similar, it can be confirmed that the crack generation rates of the positive electrode active materials according to Examples 1 to 6 are reduced.

Cracks generated in the positive electrode active materials according to repeated charging/discharging are most likely due to polarization caused by charging/discharging. As the polarization in particles increases, stress caused by the change in particle volume by the repeated charging/discharging is accumulated to generate cracks in the particles, resulting in early deterioration or a shortened lifetime of the positive electrode active materials.

Experimental Example 5. Evaluation of Electrochemical Properties of Lithium Secondary Battery (1) A charging/discharging experiment was performed on each lithium secondary battery (coin cell) manufactured in Preparation Example 2 using an electrochemical analyzer (Toyo, Toscat-3100) at 25° C. in a voltage range of 3.0V to 4.3V at a discharge rate of 0.1C to 5.0C to measure the C-rate efficiency of 5.0C/0.1C.

(2) In addition, after 50 cycles of charging/discharging of the same lithium secondary battery at 25° C. in an operating voltage range of 3.0V to 4.4V under a condition of 1C/1C, the rate of the discharge capacity at the $50^{th}$ cycle (capacity retention) relative to the initial capacity was measured.

(3) In addition, the same lithium secondary battery was subjected to 1 cycle of charging (SOC 100) under conditions of 25° C. and 1C and then 50 cycles of charging/discharging under conditions of DC-IR and 1C/1C, and DC-IR was measured in a charged state (SOC 100) to confirm DC-IR increments before and after lifetime.

The measurement results are shown in Table 6 below.

TABLE 6

| Classification | Charge capacity (mAh/g) | Discharge capacity (mAh/g) | Charge/discharge efficiency (%) | DC-IR (before lifetime) | DC-IR (after lifetime) | Retention@50 cy (%) |
|---|---|---|---|---|---|---|
| Example 1 | 233.6 | 207.1 | 88.7 | 4.70 | 15.16 | 89.5 |
| Example 2 | 233.5 | 206.9 | 88.6 | 4.65 | 14.04 | 88.1 |
| Example 3 | 233.8 | 207.0 | 88.5 | 4.59 | 13.88 | 88.6 |
| Example 4 | 234.1 | 207.2 | 88.5 | 5.01 | 13.98 | 88.9 |
| Example 5 | 234.0 | 207.0 | 88.5 | 4.77 | 13.44 | 88.9 |
| Example 6 | 234.1 | 207.1 | 88.5 | 4.69 | 13.07 | 88.9 |
| Comparative Example 1 | 233.3 | 206.1 | 88.3 | 6.11 | 16.11 | 82.6 |
| Comparative Example 2 | 233.3 | 206.6 | 88.6 | 6.30 | 18.14 | 83.4 |
| Comparative Example 3 | 233.6 | 206.9 | 88.6 | 6.51 | 16.99 | 81.9 |
| Comparative Example 4 | 233.0 | 205.7 | 88.3 | 6.15 | 16.78 | 84.6 |

Referring to the results in Table 6, it can be confirmed that lithium secondary batteries using the positive electrode active materials according to Examples 1 to 6 and lithium secondary batteries using the positive electrode active materials according to Comparative Examples 1 to 4 exhibit almost similar charge/discharge efficiency.

However, it can be confirmed that the DC-IR before/after the lifetime of the lithium secondary batteries using the positive electrode active materials according to Examples 1 to 6 are lower than those of Comparative Examples 1 to 4.

The above result corresponds to the purpose of the present invention that is intended to improve the transport/diffusion ability of lithium ions by controlling the morphology or crystal structure of a small particle included in a bimodal-type positive electrode active material and accordingly to prevent an unnecessary increase in resistance.

In addition, it can be confirmed that the rate of the discharge capacity at the $50^{th}$ cycle (capacity retention) of the lithium secondary batteries using the positive electrode active materials according to Examples 1 to 6 is also higher than those of Comparative Examples 1 to 4.

While factors that affect the cycling capacity retention of these lithium secondary batteries may vary, considering all the results shown in Tables 5 and 6, it can be expected that these results are due to the inhibition of crack generation in the positive electrode active materials according to Examples 1 to 6 compared to those in Comparative Examples 1 to 4, resulting in inhibiting the early deterioration or shortened lifetime of the positive electrode active materials.

In the above, the embodiments of the present invention have been described, but it will be understood by those of ordinary skill in the art that the present invention may be changed and modified in various ways by addition, alteration, or deletion of components without departing from the spirit of the present invention defined in the appended claims.

The invention claimed is:

1. A bimodal positive electrode active material comprising a first lithium composite oxide as a small particle and a second lithium composite oxide as a large particle,
   - wherein the first lithium composite oxide has an average particle diameter smaller than that of the second lithium composite oxide,
   - wherein the first lithium composite oxide and the second lithium composite oxide are each independently at least one unit particle,
   - a number of unit particles constituting the first lithium composite oxide is smaller than that of the second lithium composite oxide,
   - a ratio of a major axis length (r1) and a minor axis length (r2) of the unit particles constituting the first lithium composite oxide is 1.3 to 2.1, wherein the major axis length (r1) of the unit particle constituting the first lithium composite oxide corresponds to a major axis length of a first crystal plane corresponding to a (003) plane in a crystal structure of the unit particle, and
   - the minor axis length (r2) of the unit particle constituting the first lithium composite oxide corresponds to a minor axis length perpendicular to the major axis length (r1) of the first crystal plane, and
   - wherein the first lithium composite oxide and the second lithium composite oxide are each independently represented by Formula 1 below, $$Li_wNi_{1-(x+y+z)}Co_xM1_yM2_zO_2 \quad \text{[Formula 1]}$$

wherein,
   - M1 is at least one selected from Mn and Al,
   - M2 is at least one selected from P, Sr, Ba, B, Ce, Cr, Mn, Mo, Na, Ca, K, Ti, Zr, Al, Hf, Ta, Mg, V, Zn, Si, Y, Sn, Ge, Nb, W and Cu,
   - M1 and M2 are different, and
   - $0.5 \le w \le 1.5$, $0 \le x \le 0.20$, $0 \le y \le 0.20$, and $0 \le z \le 0.20$.

2. The positive electrode active material of claim 1, wherein the first lithium composite oxide is present as a single unit particle, and
   - the second lithium composite oxide is present as a secondary particle including a plurality of unit particles.

3. The positive electrode active material of claim 1, wherein a lithium ion diffusion path is formed along a major axis direction of the unit particle that constitutes the first lithium composite oxide.

4. The positive electrode active material of claim 1, wherein
   - a lithium ion diffusion path is formed along a major axis direction of the first crystal plane in the unit particle that constitutes the first lithium composite oxide.

5. The positive electrode active material of claim 4, wherein at least one second crystal plane different from the (003) plane is present in the unit particle constituting the first lithium composite oxide, and
   - the lithium ion diffusion path is directed to the at least one second crystal plane.

6. The positive electrode active material of claim 5, wherein the at least one second crystal plane comprises at least one crystal plane selected from a (012) plane and a (104) plane.

7. The positive electrode active material of claim 1, wherein, for the first lithium composite oxide and the second lithium composite oxide, the molar ratio of nickel calculated by Equation 1 below is 0.6 or more, $$Ni(\text{molar ratio})=Ni(\text{mol }\%)/(Ni(\text{mol }\%)+Co(\text{mol }\%)+M1(\text{mol }\%)+M2(\text{mol }\%)) \quad \text{[Equation 1]}.$$

8. The positive electrode active material of claim 1, wherein the average particle diameter of the first lithium composite oxide is 2.5 to 5.0 μm.

9. The positive electrode active material of claim 1, wherein the average particle diameter of the second lithium composite oxide is 10 to 18 μm.

10. The positive electrode active material of claim 9, wherein the average particle diameter of the unit particles that constitute the second lithium composite oxide is 0.1 to 5.0 μm.

11. The positive electrode active material of claim 1, wherein a ratio of peak intensities attributed to (003) and (012) planes obtained through X ray diffraction analysis using Cu-Kα rays for the unit particle constituting the first lithium composite oxide satisfies Relationship 1 below, $$0.090 \le I(012)/I(003) \le 0.120 \quad \text{[Relationship 1]}.$$

12. The positive electrode active material of claim 1, wherein a ratio of peak intensities attributed to (003) and (104) planes obtained through X ray diffraction analysis using Cu-Kα rays for the unit particle constituting the first lithium composite oxide satisfies Relationship 2, $$0.420 \le I(104)/I(003) \le 0.540 \quad \text{[Relationship 2]}.$$

13. The positive electrode active material of claim 1, further comprising:
   - a first coating layer that covers at least a part of a surface of the unit particle constituting the first lithium composite oxide, and wherein the first coating layer comprises at least one metal oxide represented by Formula 2 below, $Li_aA_bO_c$ [Formula 2]

Wherein,

A is at least one selected from Ni, Mn, Co, Fe, Cu, Nb, Mo, Ti, Al, Cr, Zr, Zn, Na, K, Ca, Mg, Pt, Au, B, P, Eu, Sm, W, V, Ba, Ta, Sn, Hf, Ce, Gd and Nd, $0 \le a \le 10$, $0 \le b \le 8$, $2 \le c \le 15$, and a and b are not 0 at the same time.

14. The positive electrode active material of claim 13, wherein there is a concentration gradient in which the concentration of element A of Formula 2 decreases from the surface to center of the unit particle.

15. The positive electrode active material of claim 1, further comprising:

a second coating layer that covers at least a part of a surface of the unit particle constituting the second lithium composite oxide, and wherein the second coating layer comprises at least one metal oxide represented by Formula 2 below, $Li_aA_bO_c$ [Formula 2]

Wherein,

A is at least one selected from Ni, Mn, Co, Fe, Cu, Nb, Mo, Ti, Al, Cr, Zr, Zn, Na, K, Ca, Mg, Pt, Au, B, P, Eu, Sm, W, V, Ba, Ta, Sn, Hf, Ce, Gd and Nd, $0 \le a \le 10$, $0 \le b \le 8$, $2 \le c \le 15$, and a and b are not 0 at the same time.

16. The positive electrode active material of claim 15, wherein there is a concentration gradient in which the concentration of element A of Formula 2 decreases from the surface to center of the unit particle.

17. The positive electrode active material of claim 15, wherein the second lithium composite oxide is present as a secondary particle including a plurality of unit particles, and the metal oxide is present in a diffused state along the grain boundary defined between adjacent unit particles from the surface to center of the secondary particle.

18. The positive electrode active material of claim 1, wherein when a wt % of the first lithium composite oxide in the positive electrode active material is w1, and a wt % of the second lithium composite oxide therein is w2, w2/w1 is 1.5 to 9.0.

19. A positive electrode comprising the positive electrode active material of claim 1.

* * * * *